United States Patent [19]

Conversano et al.

[11] Patent Number: 5,256,866
[45] Date of Patent: Oct. 26, 1993

[54] HAND HELD SCANNER

[75] Inventors: Giuseppe R. Conversano; David G. Mateer, both of Boulder, Colo.

[73] Assignee: Soricon Corporation, Boulder, Colo.

[21] Appl. No.: 798,880

[22] Filed: Nov. 25, 1991

Related U.S. Application Data

[63] Continuation of Ser. No. 438,175, Nov. 16, 1989, abandoned.

[51] Int. Cl.$^5$ .............................................. G06K 7/10
[52] U.S. Cl. ...................................... 235/472; 235/470
[58] Field of Search ............... 235/462, 454, 472, 473, 235/470; 356/399, 400

[56] References Cited

U.S. PATENT DOCUMENTS

| | | | |
|---|---|---|---|
| 3,711,723 | 1/1973 | McMurtry | 235/473 |
| 3,744,025 | 7/1973 | Bilgutay | 235/462 |
| 3,832,686 | 8/1974 | Bilgutay | 235/473 |
| 3,868,514 | 2/1975 | Israelsson | 235/473 |
| 3,918,029 | 11/1975 | Lemelson | 235/473 |
| 4,210,802 | 7/1980 | Sakai | 235/462 |
| 4,240,748 | 12/1980 | Blanc et al. | 356/138 |
| 4,476,381 | 10/1984 | Rubin | 235/375 |
| 4,835,374 | 5/1989 | Swartz et al. | 235/472 |

FOREIGN PATENT DOCUMENTS 1441137  6/1976 United Kingdom ............... 235/472

Primary Examiner—Eugene R. LaRoche
Assistant Examiner—Christopher R. Glembocki
Attorney, Agent, or Firm—Rosen, Dainow & Jacobs

[57] ABSTRACT

An optical scanning wand is disclosed that provides improved illumination of the document scanned and improved visual control of the movement of the wand. The wand comprises a handle having a hollow tip disposed at an oblique angle thereto. The tip has a scanning window opening at its distal end that defines the target zone through which the image being scanned should pass. In one embodiment light is directed to the document through the transparent tip. In another embodiment the light is directed toward the document by optical fibers from a light source located behind the wand's light sensor and the tip is cut away to provide viewing window openings.

21 Claims, 2 Drawing Sheets

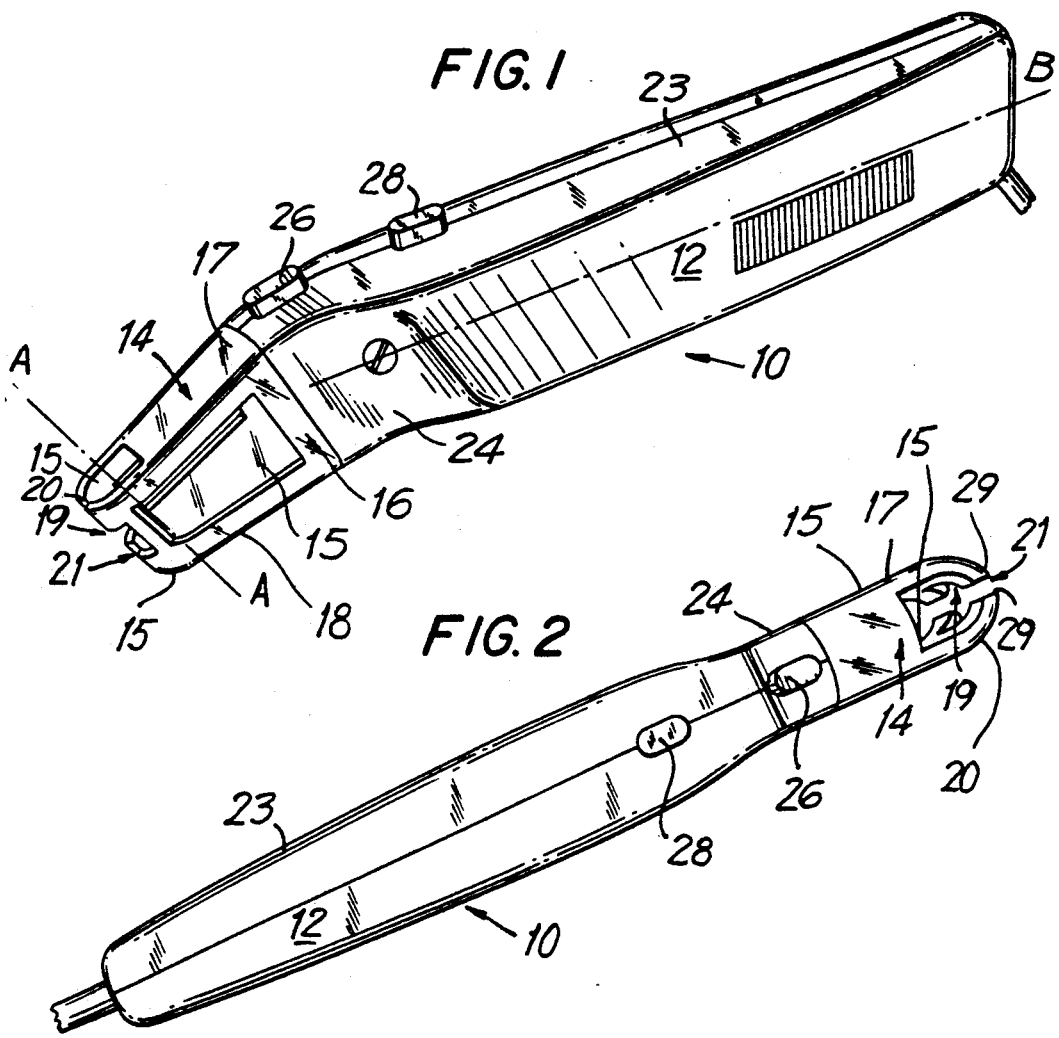
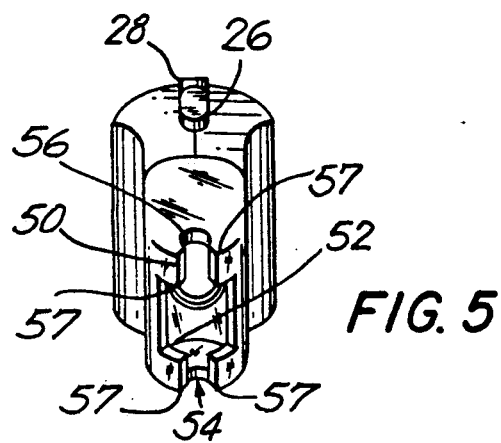

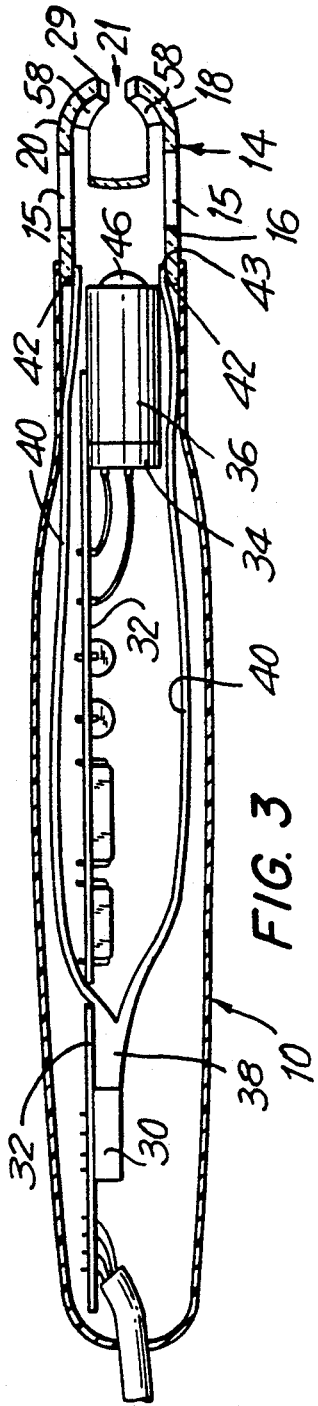
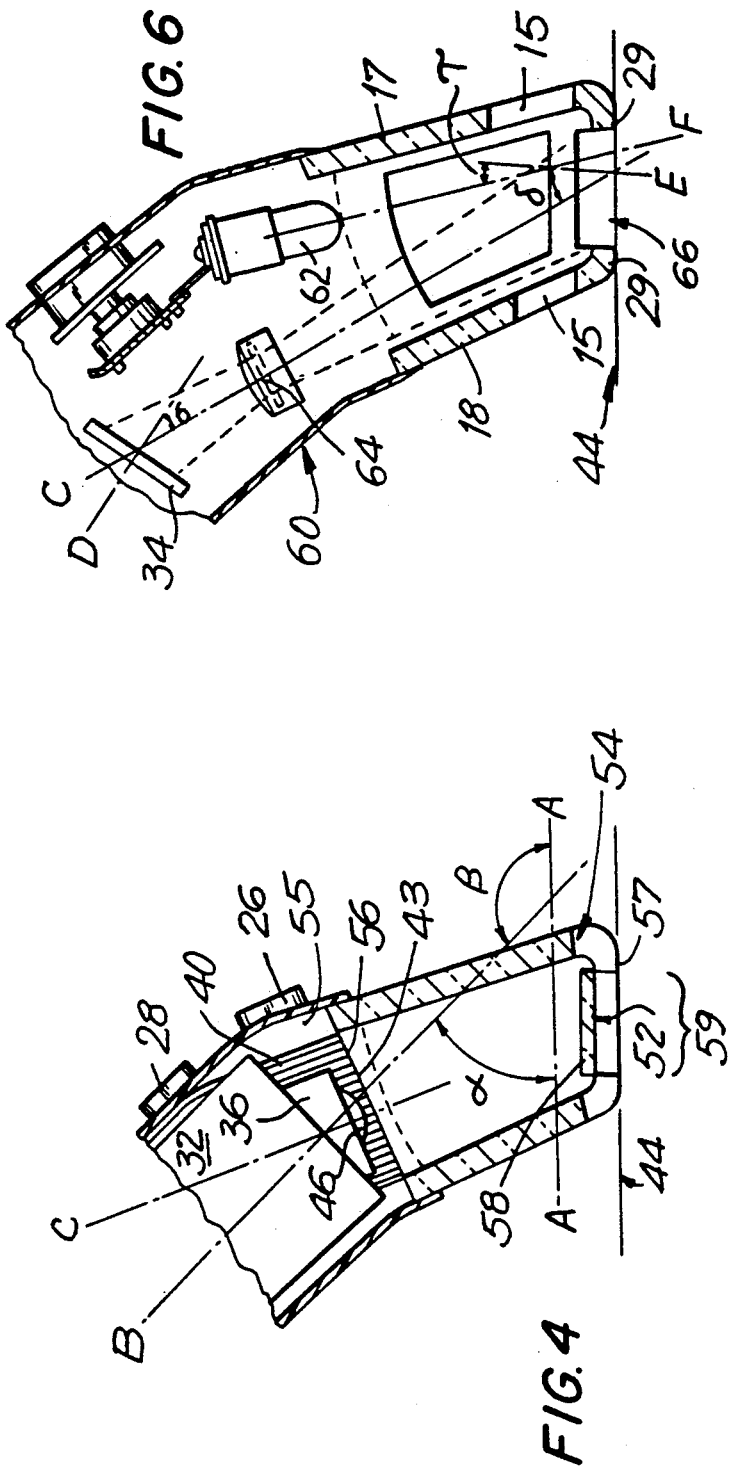

HAND HELD SCANNER

This application is a continuation of application Ser. No. 07/438,175, filed Nov. 16, 1989, now abandoned.

BACKGROUND OF THE INVENTION

1. Field of the Invention

The present invention relates to optical scanners that convert graphic information and printed text to digital signals. More particularly, the present invention relates to hand-held optical scanners.

2. Discussion of Related Art

Hand-held scanning wands are well known in the art. These wands are stroked across graphical information such as a strip of bar code or a line of text and, in cooperation with electronic devices located in the wand or communicating with the wand, convert the graphical information into digital signals that can be processed by a computer.

For scanning bar code, the wand need only pass from one end of a bar code strip to the other, without regard to the wand's vertical placement within the strip. However, when other graphical images are scanned, particularly printed text, the position of the wand on the line of text along the axis normal to the wand's line of travel down the line of text affects the usefulness of the converted information. In particular, where the wand is used in conjunction with optical character recognition (OCR) software to convert printed text to computer-usable text, e.g. ASCII code, entire characters must be scanned in the course of each such stroke of the wand in order to assure that the characters will be accurately reproduced when the line of text is converted to digital data by the OCR software.

Thus, it is critically important that the top and bottom edges of the line of text remain within the detection zone of the wand as it is stroked along a line of text. However, the smaller and more convenient a wand is to use, the smaller the detection zone at the tip of the wand will be, and a smaller detection zone makes it more difficult to maintain the necessary alignment between the tip of the wand and the line of text.

SUMMARY OF THE INVENTION

It is a principal object of the invention to provide improved control of the relationship between a wand and the information it scans as the wand is stroked across an image formed on the object plane.

This and other objects of the invention are achieved by a wand that comprises a tip constructed so that the information being scanned on the object plane is substantially or entirely visible through the tip. The tip includes a surface which defines the object plane of the wand. The wand also comprises means for defining a target zone in the wand's maximum detection zone. The means defining the target zone cooperates with said tip so as to be visible to the operator through the tip of the wand.

In a particular embodiment, the wand includes a handle to which the tip is connected, and the longitudinal axis of the handle forms an oblique angle with the object plane.

In another embodiment, the wand comprises a sensor having a given maximum detection zone and a light source. The light source is preferably located behind the light sensor, on the opposite side of the light sensor from the light sensor's object plane, and the light from the light source is provided to the target area on the object plane by a light conduit. The light conduit preferably includes optical fibers that provide light at a plurality of locations for projection onto the target area.

BRIEF DESCRIPTION OF THE DRAWING

The features and advantages of the present invention will be better understood when the following detailed description of a preferred embodiment is considered in conjunction with the drawings provided, wherein:

FIG. 1 is perspective view of apparatus in accordance with the present invention;

FIG. 2 is a top view of the apparatus of FIG. 1;

FIG. 3 is a bottom view of the apparatus of FIG. 1 in cross section;

FIG. 4 is a partially cut away side view of a first alternative embodiment of the present invention in cross section;

FIG. 5 is a front view of the first alternative embodiment; and

FIG. 6 is a detail side view of a second alternative embodiment of the present invention in cross section.

DETAILED DESCRIPTION OF THE PREFERRED EMBODIMENTS

With reference to FIGS. 1 and 2, a scanning wand 10 in accordance with a preferred embodiment of the present invention comprises a slim, rectangular handle 12 and a hollow "bullnose" transparent tip 14 that is approximately 38 mm long. Viewing window openings 15 are provided on either side 16 of the tip 14 and on the upper 17 and lower 18 surfaces of the tip 14 at its distal end. The tip 14 also has a rectangular scanning window opening 19 in the semi-cylindrical curved surface 20 at its distal end. The scanning window opening 19 is continuous with a slot-shaped opening 21 in the curved surface 20 at the end of the tip 14. The slot 21 extends parallel to the axis (A) of the curved surface 20.

When the wand 10 is used to provide information input of OCR software, the edges of the scanning window opening 19 that touch the document define target zone within which the entire height of the alphanumeric characters in a given line of text that is being scanned should appear, in order to assure reliable conversion of the characters in the line of text to a computer-usable form. The window opening 19 provides a clear view of the characters being scanned. The slot opening 21 provides a clear view of the areas of the document immediately above and below each character in the line of text, to assist the operator in guiding the target zone tip of the wand 10. In this embodiment the target zone defined on the object plane by the scanning window 19 is also coextensive with the maximum detection zone provided by the wand's light sensor. Alternatively, a target zone that is somewhat smaller than the maximum detecting zone may be used, thereby providing a safety margin to prevent slight deviations from the correct alignment of the target zone with the line of text from causing errors in the converted text.

The handle 12 comprises a straight portion 23 that is approximately 127 mm long and a shorter, curved portion 24. A scanning switch 26 is mounted on the curved portion 24 of the handle 12. This switch 26 enables the wand's light sensor and increases the brightness of the wand's light source, to initiate the scanning operation.

A programmable function switch 28 is provided behind the scanning switch 26, on the straight portion 23 of the handle 12. This switch may be software programmed to select an alternative scanning mode, a special mode for use with bar code, for example, or to insert an end of line (EOL) code into scanned text, or to provide some other software-defined function.

The axis (A) of the semi-cylindrical curved surface 20 and the surface defined by the two edges 29 of the slot 21 that are parallel to the axis (A) of the curved surface 20 form a 49-degree angle α with the longitudinal axis (B) of the handle. Thus the axis (B) of the handle forms an oblique 131-degree angle β to the document being scanned when the two edges 29 of the slot 21 in the tip 14 are stroked across the document, thereby placing the document in the wand's object plane, as explained in greater detail below. These complementary angles α and β may be varied to accommodate applications where access to the document being scanned is obstructed, as in copier print quality maintenance applications. This particular oblique angle for the handle 12 has been found to be most satisfactory for maximizing target zone visibility and operator comfort.

With reference to FIG. 3, it can be seen that the light source 30 of the wand 10 is mounted on a circuit board 32 behind the CCD detector array 34 of the light sensor 36. A bundle of optical fibers 38 directs the light provided by the light source 30 to the scanning end of the handle 12. The fiber bundle 38 is bifurcated so that half of the bundle 38 passes through the circuit board 32, and each half then fans out to form two thin ribbon cables 40 of optical fibers that pass along the length of the handle 23 on either side of the light sensor 36. The ribbon cables 40 terminate at the upper edge of the tip 14 and are glued in place against the inside surface of the tip 14 by adhesive 42. Alternatively, the ribbon cables may be held in place by clips formed on the interior surface of the handle 12. The ends 43 of the ribbon cables 40 are angled inward so as to direct light away from the sides 16 of the tip 14 toward the slot 21, thereby providing illumination of the target zone on the document being scanned.

When the two edges 29 of the cylindrical curved surface 20 of the tip 14 on either side of the slot 21 are resting on a document, see FIG. 4, the longitudinal axis (B) of the wand is disposed in a plane perpendicular to the document at a 49-degree angle with the document, and the document is lying in the object plane 44 of the light sensor 36, thereby providing optimum focus for the image of information from the document on the detector array 34. The image on the portion of the wand's object plane 44 that appears in the window 19 is then inverted and focused on the detector array 34 by a lens 46 having an optical axis (C). The image plane on the detector array 34 is oriented so that lines (D) and (E) normal to the image plane provided by the detector array 34 and normal to the object plane 44 of the light sensor 36, respectively, form angles σ, δ with the optical axis (C) of the lens 46, as is illustrated in FIG. 6. In all embodiments, the image plane of the detector is angled back from the object plane to compensate for the obliqueness of the lens with respect to the object plane.

FIGS. 4 and 5 show one alternative embodiment of the present invention. In this embodiment, the hollow transparent tip 50 has a scanning window opening 52 and a slot opening 54 but no viewing window openings. The ribbon cables 40 lie flush against the sides 55 of the curved portion 24 of the handle 12 and ends 43 of the optical fibers in the ribbon cables 40 abut the upper edge 56 of the transparent tip 50 so that the light transmitted by the optical fibers is directed into the solid sides of the hollow tip.

The light from the ribbon cables 40 is then conducted by internal reflection within the transparent tip 50 to two planar exit facets 58 that are located along each side of the scanning window 52 parallel to the edges 57 of the slot 54. These planar facets 58 are oriented at a 45-degree angle to the wand's object plane, so that light exiting through these facets 58 is directed into the scanning window 52 to provide even illumination of the target zone 59 on the object plane.

FIG. 6 shows another alternative embodiment of the present invention that is externally similar in appearance to the scanning wand 10 shown in FIG. 1. However, in this scanning wand 60, the light source 62 and a spherical lens 64 for the light sensor (not shown) are oriented so that their respective axes (F) and (C) intersect. The axis (F) of the light source 62 forms a 15-degree angle τ with line (E), and the optical axis (C) of the spherical lens 64 forms a 30-degree angle δ with the line (E) that is normal to the object plane 44, providing optimum illumination for the target area 66 of the light sensor. For applications where access to the document is obstructed, the angle δ may also be varied. The angle δ can even be increased to about 60 degrees by the use of a complex lens. However, the selected offset angles for the handle 12 and δ for the optics 34, 62, 64 provide an optimum combination of scanning accuracy and operator convenience.

The present invention has been described with particular reference to presently preferred embodiments thereof. However, variations and modifications thereof will be obvious to one skilled in the art. For example the tip shown in FIG. 1 may be made of stainless steel. The disclosed preferred embodiment is illustrative rather than limitative of the invention. The scope of the invention is defined by the appended claims.

I claim:

1. A wand for scanning information extending in a given direction in a given object plane, said wand having a given maximum detection zone in said given object plane, said wand comprising:
   a transparent tip having surfaces defining said given object plane, said tip having an aperture therein defining a target zone in the maximum detection zone of said given object plane, and a slit extending perpendicular to said given direction through said aperture to permit said tip to be guided by a user along said surface with said target zone lying in said maximum detection zone, said tip also having viewing window apertures extending therethrough in said given direction and perpendicular to said given direction to permit the user to observe said target zone therethrough.

2. The wand of claim 1 wherein said target zone is equal to the maximum detection zone.

3. The wand of claim 1 wherein said transparent tip having surfaces defining said given object plane includes an aperture in the surfaces defining said given object plane defining a target zone in the maximum detection zone of said given object plane.

4. A wand for scanning a line of information on a surface, said wand having a given maximum detection zone for a given object plane, said wand comprising:
   an elongated handle having a given longitudinal axis;
   a transparent tip on said handle, said tip having an end opposite to said handle and adapted to engage said surface and define said object plane, said end comprising means defining a target zone in the maximum detection zone of said given object plane so that said end of the tip defines a plane as the wand is moved along the line of information by an operator, said tip having apertures extending therethrough along first and second relatively orthogonal axes to enable a clear view therethrough of said information;

said handle and said tip being mounted together to define an oblique angle between said longitudinal axis and object plane so that said target zone is visible through said transparent tip, so that said target zone can be guided by the operator.

5. A wand for scanning information, said wand comprising:

a handle;

an optical sensor in said handle, said sensor having an image plane in said handle, an object plane beyond said handle in a direction that is oblique to the longitudinal axis of said handle, and a given maximum detection zone in said object plane;

a transparent tip on said handle, said tip having surfaces defining said object plane;

said tip comprising an aperture defining a target zone in said maximum detection zone on said object plane, said aperture being visible through said transparent tip, and a slit extending through said aperture, so that said information is visible to an operator through said aperture and said slit and said target zone can be guided by an operator.

6. The wand of claim 5 further comprising a lens in said optical sensor between said image plane and said object plane, wherein said image plane is oblique to the longitudinal axis of said handle and lines normal to said image and object planes form angles with the optical axis of said lens such that said angle of the line normal to the image plane compensates for said angle of the line normal to the object plane.

7. The wand of claim 5 further comprising an aperture in the side of said transparent tip, whereby the user is provided with view of said target zone.

8. The wand of claim 7 wherein said means for defining a target zone in said maximum detection zone is an aperture in said surface of the transparent tip, whereby the user is provided with view of the object plane in said target zone.

9. The wand of claim 5 further comprising a light source in said handle, said light source being positioned to illuminate said target zone in the maximum detection zone.

10. The wand of claim 9 wherein said light source is positioned to provide illumination along an axis that is oblique to said object plane.

11. The wand of claim 10 wherein said light source is located above said object plane when said tip surface is rested on said object plane and the axis of said light intersects the object plane at a point above the center of said maximum image detection area.

12. The wand of claim 10 wherein said light source is located behind said optical sensor and said light is provided through a light conduit.

13. The wand of claim 12 wherein said conduit includes optical fibers.

14. The wand of claim 13 wherein said optical fibers provide a light path that bifurcates at a point behind said optical sensor so as to provide light along either side of said sensor.

15. The wand of claim 13 wherein a first plurality of the fibers that provide said light are disposed in a plane normal to said object plane along a portion of their length.

16. The wand of claim 15 wherein a second plurality of the fibers that provide said light are disposed in a plane normal to said object plane along a portion of their length, said plane being located on the opposite side of said optical sensor from said first plurality of fibers.

17. The wand of claim 16 wherein one end of said portions of said fibers is angled inward so as to direct light toward said target zone.

18. The wand of claim 12 wherein said conduit includes said transparent tip.

19. The wand of claim 18 further comprising a light exit face on each side of the scanning window in said tip.

20. The wand of claim 19 wherein said faces are parallel to said slot and form approximately a 45 degree angle with said object plane.

21. A scanning wand comprising:

a handle;

an optical sensor in said handle, said sensor having an object plane opposite to said handle and extending in a plane oblique to the longitudinal axis of said handle and having a given maximum detection zone on said object plane;

a transparent tip on said handle, said tip having a surface defining said object plane;

an aperture in said tip defining a planar target zone in said maximum detection zone on said object plane, said aperture being visible through said transparent tip;

a slit extending through said aperture in a given direction to permit viewing of a surface in said object plane beyond said target zone in said given direction and a light source in said handle, said light source being mounted to direct light to said target zone so that illumination is provided to said target zone through said transparent tip.

* * * * *